Figure 1:
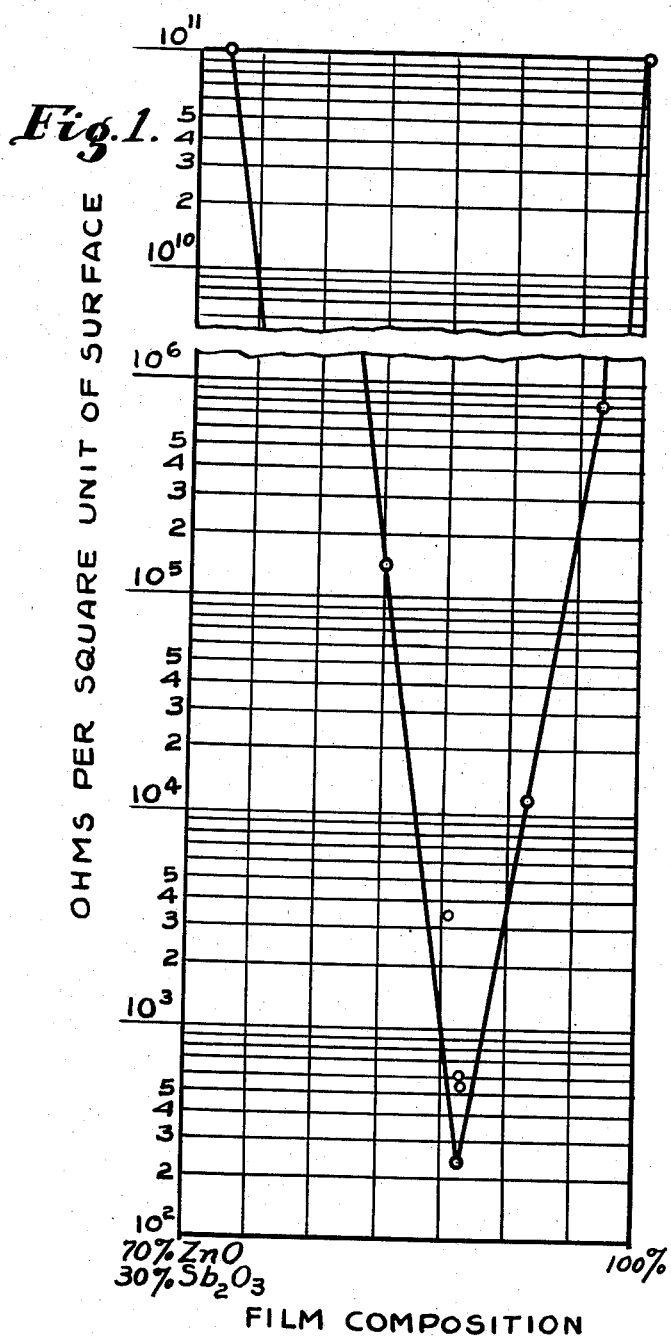

Oct. 21, 1958     J. K. DAVIS     2,857,294
ELECTROCONDUCTIVE ARTICLE

Filed Aug. 3, 1955

INVENTOR.
JAMES K. DAVIS
BY Clarence R. Patty, Jr.
ATTORNEY

United States Patent Office 2,857,294
Patented Oct. 21, 1958

2,857,294
ELECTROCONDUCTIVE ARTICLE

James K. Davis, Elmira, N. Y., assignor to Corning Glass Works, Corning, N. Y., a corporation of New York Application August 3, 1955, Serial No. 526,298

4 Claims. (Cl. 117—211)

This invention relates to an article comprising a ceramic body having on its surface an adherent electroconductive metal oxide film possessing an electrical resistance and other properties such as chemical stability suitable for use in electrical resistance devices such as space heaters, rheostats, resistors, and the like.

Electroconductive metal oxide films are formed on ceramic bodies such as glass by heating such a body to 500–800° C. or above and contacting it while so heated with a salt or other compound of a metal in solid form or in the form of a vapor or an atomized solution thereof or by dipping the hot glass momentarily into such a solution. Films so produced are strongly adherent and their thicknesses may vary from a few millimicrons to hundreds of microns depending upon the concentration of the metal compound and the length of time that the hot glass is treated therewith.

Films in which the thickness varies less than a wavelength of visible light are usually iridescent in appearance, due to the interference of visible radiations of different wave lengths reflected from the film and from the glass beneath the film. On this account such films have in the past been used extensively in the production of artistic glassware, the process being known as iridizing and the resulting films as iridized films.

Most such metal oxide films have infinite electrical resistance and only a few have an electrical resistance below 1 megohm per square unit of surface. The presence of traces or of substantial amounts of another metal oxide in such an electroconductive film, usually raises its resistance, particularly if such added metal oxide individually forms only a non-conductive film. As an exception to this rule, however, the addition of antimony oxide, which by itself produces films of infinite electrical resistance, to an electroconductive film composed of stannic oxide does not raise its electrical resistance objectionably but, in some proportions, say about 0.1% to 10% $Sb_2O_3$, actually lowers it. Heretofore, there was no known instance of an electroconductive metal oxide film being composed solely of metal oxide which individually form only non-conductive films.

I have now discovered such an instance and have found that adherent electroconductive films having electrical resistances less than 1 megohm per square unit of surface can be produced by forming a combination consisting essentially of antimony oxide and zinc oxide, neither of which by itself will produce an electroconductive film.

In accordance with the present invention a ceramic body, such as a glass body, is provided with an adherent electroconductive film consisting essentially of ZnO and antimony oxide computed as $Sb_2O_3$ in proportions ranging from about 6% to 44% ZnO and 94% to 56% $Sb_2O_3$. The electrical resistance of such a film is less than 1 megohm per square unit of surface.

Figure 2:
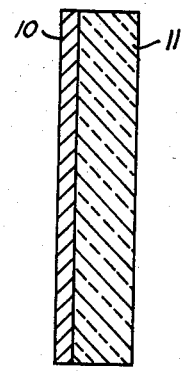

Films composed of ZnO and antimony oxide computed as $Sb_2O_3$ in proportions ranging from 23% to 30% ZnO and 77% to 70% $Sb_2O_3$ have electrical resistances not exceeding 1000 ohms per square unit of surface and non-porous ceramic articles comprising them are particularly useful for heating devices, resistors, and the like which require relatively low resistances. Fig. 1 is a graph showing the effect of film composition on electrical resistivity. Fig. 2 is a sectional view of a glass sheet having a single layer of the film of the invention.

The relationship between the electrical resistances and the compositions of the present metal oxide films is demonstrated in the graph shown in Fig. 1 in which the electrical resistance of the film in ohms per square unit of surface is plotted against its composition. Since the change in the electrical resistance is very great as compared with the change in composition, the electrical resistance is plotted on a logarithmic scale in order to permit a better presentation of the data. Moreover, in order to include for comparison the substantially infinite electrical resistances which are characteristic of compositions outside the scope of the present invention, the graph is represented as being shortened by a breaking away of an omission of a portion thereof.

The various points which delineate the curve of the graph represent the measured electrical resistances of films having the specific compositions shown by way of example in the following table:

| Ratios In Solution | | | | Film Composition (percent By Weight) | | Resistance, Ohm/Sq. (Third Order Film) |
|---|---|---|---|---|---|---|
| $ZnCl_2$ | $SbCl_5$ | ZnO | $Sb_2O_3$ | ZnO | $Sb_2O_3$ | |
| 90 | 10 | 92 | 8 | 65.4 | 34.6 | over 10¹¹ |
| 85 | 15 | 87 | 13 | 40.3 | 59.7 | 140,000 |
| 70 | 30 | 74 | 26 | 29.2 | 70.8 | 3,247 |
| 50 | 50 | 55 | 45 | 27.1 | 72.9 | 534 |
| 40 | 60 | 45 | 55 | 27.3 | 72.7 | 236 |
| 30 | 70 | 35 | 65 | 27.5 | 72.5 | 597 |
| 10 | 90 | 12 | 88 | 16.7 | 83.3 | 11,940 |
| 7 | 93 | 8 | 92 | 6.4 | 93.6 | 810,000 |
| 0 | 100 | 0 | 100 | 0.0 | 100.0 | over 10¹¹ |

The films illustrated in the table were formed on low expansion borosilicate glass plates by heating them to about 800° C. and spraying the hot glass with solutions consisting of various proportions of $ZnCl_2$ and $SbCl_5$ dissolved in 37% aqueous HCl, each solution containing a total metal salt content of 1 gram per cc. of solution. The solutions were sprayed onto the hot glass for a length of time necessary to obtain a film having a thickness of about 390 millimicrons or 3rd order red. Since the spray cools the glass, a single spray interval can amount only to about 20 seconds. If the desired thickness of the film was not obtained with a single spray interval, the glass repeatedly was reheated to 800° C. and sprayed until the desired thickness was obtained, the thickness being calculable by observation of the order of the interference color of the film. While the oxide compositions of such films are herein referred to as consisting essentially of ZnO and $Sb_2O_3$, the proportion of antimony oxide as determined either by calculation from the solution or by chemical analysis of the film is computed as $Sb_2O_3$ for convenience.

In the table the compositions of the solutions are expressed on the dry basis as the weight ratios of $ZnCl_2$ and $SbCl_5$ and the calculated corresponding weight ratios of ZnO and $Sb_2O_3$ equivalent thereto; the analytical compositions in percent by weight of the corresponding metal oxide films are shown together with their resistances in ohms per square unit of surface. The ratios of ZnO to $Sb_2O_3$ in films resulting from solutions containing the equivalent of nearly 100% $Sb_2O_3$ are practically the same as those of the corresponding solutions but such ratios in films resulting from solutions containing large amounts of ZnO are considerably smaller than those of the corresponding solutions and the ZnO content of the films at the most does not exceed about 70%.

The graph shows by interpolation that films having electrical resistances not exceeding 1 megohm per square unit of surface contain about 6% to 44% ZnO and 94% to 56% $Sb_2O_3$, while films having an electrical resistance not exceeding 1000 ohms per square unit of surface contain about 23% to 30% ZnO and 77% to 70% $Sb_2O_3$.

Individually ZnO and $Sb_2O_3$ form high resistance films and, while the introduction of small amounts of $Sb_2O_3$ alone into an electroconductive film consisting of stannic oxide lowers the electrical resistance of the film as is pointed out above, the introduction of ZnO alone, even in small amounts, into a film consisting of stannic oxide causes a particularly rapid rise in the electrical resistance of the film. Insofar as is known the introduction of ZnO or $Sb_2O_3$ in substantial amounts into all other electroconductive metal oxide films renders them non-conductive. It is the more surprising, therefore, that films consisting of ZnO and $Sb_2O_3$ in the above stated proportions have relatively low electrical resistances.

While the present electroconductive films as hereinbefore described consist of zinc oxide and antimony oxide, small amounts of oxides of other metals, which do not materially change the fundamental character of the film, may be included therein without departing from the spirit and scope of the invention as claimed.

The term glass as used herein included glazes and enamels, which are soft glasses.

In Fig. 2 an electrically conductive coating 10 having a composition consisting essentially of 6% to 44% ZnO and 94% to 56% of antimony oxide computed as $Sb_2O_3$ is shown in exaggerated thickness on a plate of glass 11.

What is claimed is:

1. An article comprising a ceramic body having on its surface an adherent electroconductive metal oxide film consisting essentially of 6% to 44% ZnO and 94% to 56% of antimony oxide computed as $Sb_2O_3$.

2. An article according to claim 1 in which the ceramic body is glass.

3. An article comprising a ceramic body having on its surface an adherent electroconductive metal oxide film consisting essentially of 23% to 30% ZnO and 77% to 70% of antimony oxide computed as $Sb_2O_3$.

4. An article according to claim 3 in which the ceramic body is glass.

References Cited in the file of this patent

UNITED STATES PATENTS

| | | |
|---|---|---|
| 2,564,706 | Mochel | Aug. 21, 1951 |
| 2,569,773 | Orr | Oct. 2, 1951 |
| 2,614,944 | Lytle | Oct. 21, 1952 |
| 2,724,658 | Lytle | Nov. 22, 1955 |

FOREIGN PATENTS

| | | |
|---|---|---|
| 1,044,713 | France | June 24, 1953 |